US012575006B2

(12) United States Patent
Garcia Benitez et al.

(10) Patent No.: US 12,575,006 B2
(45) Date of Patent: Mar. 10, 2026

(54) HEATING-WIRE DEVICE AND METHOD FOR PRODUCING A HEATING-WIRE DEVICE

(71) Applicant: Robert Bosch GmbH, Stuttgart (DE)

(72) Inventors: Cesar Garcia Benitez, Stuttgart (DE); Juergen Nawrot, Sonthofen (DE); Sina Dons, Wuerzburg (DE)

(73) Assignee: ROBERT BOSCH GMBH, Stuttgart (DE)

(*) Notice: Subject to any disclaimer, the term of this patent is extended or adjusted under 35 U.S.C. 154(b) by 845 days.

(21) Appl. No.: 17/903,456

(22) Filed: Sep. 6, 2022

(65) Prior Publication Data

US 2023/0079907 A1 Mar. 16, 2023

(30) Foreign Application Priority Data

Sep. 15, 2021 (DE) ..................... 10 2021 210 186.0

(51) Int. Cl.
*H05B 3/28* (2006.01)

(52) U.S. Cl.
CPC ....... *H05B 3/286* (2013.01); *H05B 2203/017* (2013.01)

(58) Field of Classification Search
CPC ...................................................... H05B 3/286
See application file for complete search history.

(56) References Cited

U.S. PATENT DOCUMENTS

2011/0188838 A1* 8/2011 Abbott ..................... H05B 3/34 392/407

FOREIGN PATENT DOCUMENTS

| | | | | |
|---|---|---|---|---|
| CN | 103608170 A | * | 2/2014 | F16L 53/38 |
| DE | 10309207 A1 | * | 2/2004 | B29C 66/4722 |
| EP | 1778413 B1 | | 3/2016 | |
| EP | 4134594 A1 | * | 2/2023 | F24D 3/149 |
| RU | 2342807 C2 | * | 12/2008 | H05B 3/56 |
| WO | WO-2011001953 A1 | * | 1/2011 | H05B 3/34 |
| WO | WO-2011014428 A1 | * | 2/2011 | B29C 48/06 |
| WO | WO-2011034272 A1 | * | 3/2011 | H05B 6/6482 |
| WO | WO-2022054701 A1 | * | 3/2022 | B62D 1/065 |
| WO | WO-2024217954 A1 | * | 10/2024 | H05B 3/84 |

OTHER PUBLICATIONS

DE_10309207 Translation, 2004.*

* cited by examiner

*Primary Examiner* — Woody A Lee, Jr.
(74) *Attorney, Agent, or Firm* — NORTON ROSE FULBRIGHT US LLP

(57) ABSTRACT

A heating-wire device. The heating-wire device includes at least one heating wire, a heating region, which comprises the at least one heating wire embedded therein and can be heated by the heating wire; a current source, which is connected to the heating wire and is configured to apply a current to the heating wire and heat it; a controller, using which the current source can be controlled; a first adhesion-promoting layer, which is arranged on a surface of the heating wire and surrounds the surface thereof, wherein the heating region surrounds the first adhesion-promoting layer.

7 Claims, 2 Drawing Sheets

HEATING-WIRE DEVICE AND METHOD FOR PRODUCING A HEATING-WIRE DEVICE

CROSS REFERENCE

The present application claims the benefit under 35 U.S.C. § 119 of German Patent Application No. DE 10 2021 210 186.0 filed on Sep. 15, 2021, which is expressly incorporated herein by reference in its entirety.

FIELD

The present invention relates to a heating-wire device and to a method for producing a heating-wire device.

BACKGROUND INFORMATION

In standard devices for heating surfaces, for example plastics surfaces, wires having a specific electrical resistance can be introduced into or applied to the material to be heated using various manufacturing methods. For the heating, the wires can be electrically contacted and, by way of a current flow and a drop in voltage, a defined heating power can be generated and the surface can be heated. To do this, drawn metal wires (e.g., made of steel alloys or copper) can usually be used. So that a specific heating power can be ensured, the wires can be arranged at a defined distance from one another, it being possible to insert winding carriers or to insert the wires using a winding apparatus or a wire-laying apparatus. In a subsequent working step, the wire can be enveloped by plastics material by way of encapsulation or laminating. The heat released by the wire can usually be coupled into a plastics matrix.

European Patent Application No. EP 1 778 413 B1 describes a method for coating metal surfaces.

SUMMARY

The present invention provides a heating-wire device and a method for producing a heating-wire device.

Preferred developments of the present invention are disclosed herein.

The present invention provides a heating-wire device and a method for producing a heating-wire device, wherein delamination of a heating region from the heating wire can be reduced. In addition, coating a heating wire can improve the wire-laying process.

According to an example embodiment of the present invention, the present invention, the heating-wire device comprises at least one heating wire, a heating region, which comprises the at least one heating wire embedded therein and can be heated by the heating wire; a current source, which is connected to the heating wire and is configured to apply a current to the heating wire and heat it; a controller, using which the current source can be controlled; a first adhesion-promoting layer, which is arranged on a surface of the heating wire and surrounds the surface thereof, wherein the heating region surrounds the first adhesion-promoting layer.

The heating region can comprise a matrix material, which can give off (pass on) heat from one or more embedded heating wires to a heating region surface to be heated.

The first adhesion-promoting layer can completely wrap around the heating wire or each of the plurality of heating wires.

The present invention also provides a coated heating wire, which contains an adhesion promoter between the wire and the heating region. This adhesion promoter firmly holds the coating on the wire and the risk of delamination between the wire and the surrounding material is reduced or even prevented. This arrangement can be characterized by the simplicity of the structure and production, by a wide range of materials that can be used, a wide range of applications, low production, manufacturing, and assembly costs, and improved reliability of the connection between the heating wire and the heating region.

The usual challenges presented by the production process and the service life can be advantageously improved in this way. Wires can be laid in a cost-optimized manner and, after production, the promotion of good heat transfer between the heating region, for example a plastics matrix, and the embedded wire can be achieved with low delamination or no delamination at all over the lifetime thereof.

The sheath and/or an outer region of the heating region can comprise a plastics matrix.

An adhesion-promoting material between the wire and the coating (heating region or further sheaths), which can simultaneously act as a stress equalization layer between the different materials, can provide further advantages, such as low tool/system wear when the wires, for example those having a smooth surface, are processed further, simple further processing and more stable processes, e.g., simplified unspooling of the wires due to their smooth surface, prevention of delamination, and equalization or reduction of different instances of thermal expansion, which can result in improved adhesion between the wire and the coating, defined heat transfer, and/or improved corrosion protection of the wire.

A main effect can be a measure counteracting delamination and comes from improved adhesion between the heating wire and the sheathing as a system, i.e., the adhesion-promoting layer(s) comprising a plastics matrix (heating region), which can sheathe everything.

According to an example embodiment of the present invention, an organic sheath can be provided, the purpose of which can be to prevent or reduce delamination between the heating wire and the sheathing plastics matrix. This organic sheath can absorb compressive stresses/tensile stresses due to different coefficients of thermal expansion between the heating wire and the plastics matrix and improve the adhesion in two directions, both between the heating wire and the sheath and between the sheath and the plastics matrix. A separate adhesion promoter may (optionally) be required in each case. Delamination between the wire and the plastics matrix can be prevented or reduced in order to ensure that heat is transported optimally from the heat source (heating wire to the surface of the heating-wire device). Increasing the wire diameter by way of the additional coating constitutes a further advantage. By increasing the surface area, a greater amount of energy can be coupled into the plastics matrix compared with the original wire diameter.

According to a preferred specific embodiment of the heating-wire device, said device comprises a sheath and a second adhesion-promoting layer, wherein the sheath surrounds the first adhesion-promoting layer and the second adhesion-promoting layer surrounds the sheath, wherein an outer region of the heating region is applied to the sheath so as to embed it therein.

The outer region can comprise a matrix material, for example can comprise a plastics matrix and an outer face, which can be heated. Using a sheath and a second adhesion-promoting layer can have an additional effect on delamination, which can be advantageously reduced or even prevented.

According to a preferred specific example embodiment of the heating-wire device, the first adhesion-promoting layer and/or the second adhesion-promoting layer comprises silane.

According to a preferred specific example embodiment of the heating-wire device, the sheath comprises an enameled coating (or lacquer) or a polymer.

According to a preferred specific example embodiment of the heating-wire device, a first coefficient of thermal expansion of the first adhesion-promoting layer is adjusted to a second coefficient of thermal expansion of the sheath, wherein the first coefficient of thermal expansion and the second coefficient of thermal expansion differ from one another by less than a predetermined first variation value.

By adjusting the coefficient of thermal expansion, differences in the expansions of the materials during the heating can be reduced and delamination of the sheath from the heating wire and/or from the first adhesion-promoting layer can be reduced or prevented.

According to a preferred specific example embodiment of the heating-wire device, a second coefficient of thermal expansion of the sheath is adjusted to a third coefficient of thermal expansion of the second adhesion-promoting layer, wherein the second coefficient of thermal expansion and the third coefficient of thermal expansion differ from one another by less than a predetermined second variation value.

By adjusting the coefficient of thermal expansion, differences in the expansions of the materials during heating can be reduced and delamination of the second adhesion-promoting layer from the sheath and from the heating wire can be reduced or prevented and an adhesive effect of the adhesion-promoting layers, radially outward and inward, can be maintained and improved. The aim can be to monitor the compressive stresses/tensile stresses initiated by different coefficients of thermal expansion of the wire and the completely sheathing plastics matrix.

The differences in stress are mainly driven by the different coefficients of thermal expansion of the wire and the plastics matrix. The aim of the adhesion promoters is to transfer these stresses that actually occur to the respective binding partners by way of good adhesion. This is comparable to a good bonded connection. Owing to this good adhesion to the bonding partner, different types of material can then be bonded and the forces transferred.

According to an example embodiment of the present invention, in a method for producing a heating-wire device, at least one heating wire is provided, the heating wire is embedded in the heating region, wherein a first adhesion-promoting layer is arranged on a surface of the heating wire and surrounds the surface thereof, wherein the heating region surrounds the first adhesion-promoting layer; a current source is provided, which is connected to the heating wire and is configured to apply a current to the heating wire and heat it; and a controller is provided, using which the current source can be controlled.

The heating region comprising the adhesion-promoting layer(s), the sheath, and further regions (for example the outer region) can be applied by injection molding or other conventional methods.

According to a preferred specific embodiment of the method of the present invention for producing a heating-wire device, an outer region of the heating region is applied to a sheath around the first adhesion-promoting layer so as to embed it therein. According to a preferred specific embodiment of the method of the present invention for producing a heating-wire device, the first adhesion-promoting layer is melted at least in some regions when it is arranged on the surface of the heating wire.

The aim is good adhesion between the sheathed wire and the plastics matrix of the heating device. Ideally, it would be desirable for the uppermost layer to melt easily, in order to obtain optimal adhesion between the wire and the plastics matrix. Considerably higher tension forces and compressive forces can then be transmitted (before delamination).

According to a preferred specific example embodiment of the method of the present invention for producing a heating-wire device, the sheath is sprayed onto the first adhesion-promoting layer and a second adhesion-promoting layer is applied to the sheath, wherein the second adhesion-promoting layer is melted at least in some regions when it is arranged on the sheath and wherein an outer region of the heating region is applied to the second adhesion-promoting layer so as to embed it therein.

The heating-wire device can also be characterized by the features set out in connection with the method and its advantages, and vice versa.

Further features and advantages of specific embodiments of the present invention will become clear from the following description with reference to the figures.

BRIEF DESCRIPTION OF THE DRAWINGS

The present invention is explained in greater detail in the following with reference to the exemplary embodiments set out in the schematic figures.

In the figures, identical reference signs denote identical or functionally identical elements.

DETAILED DESCRIPTION OF EXAMPLE EMBODIMENTS

Figure 1:
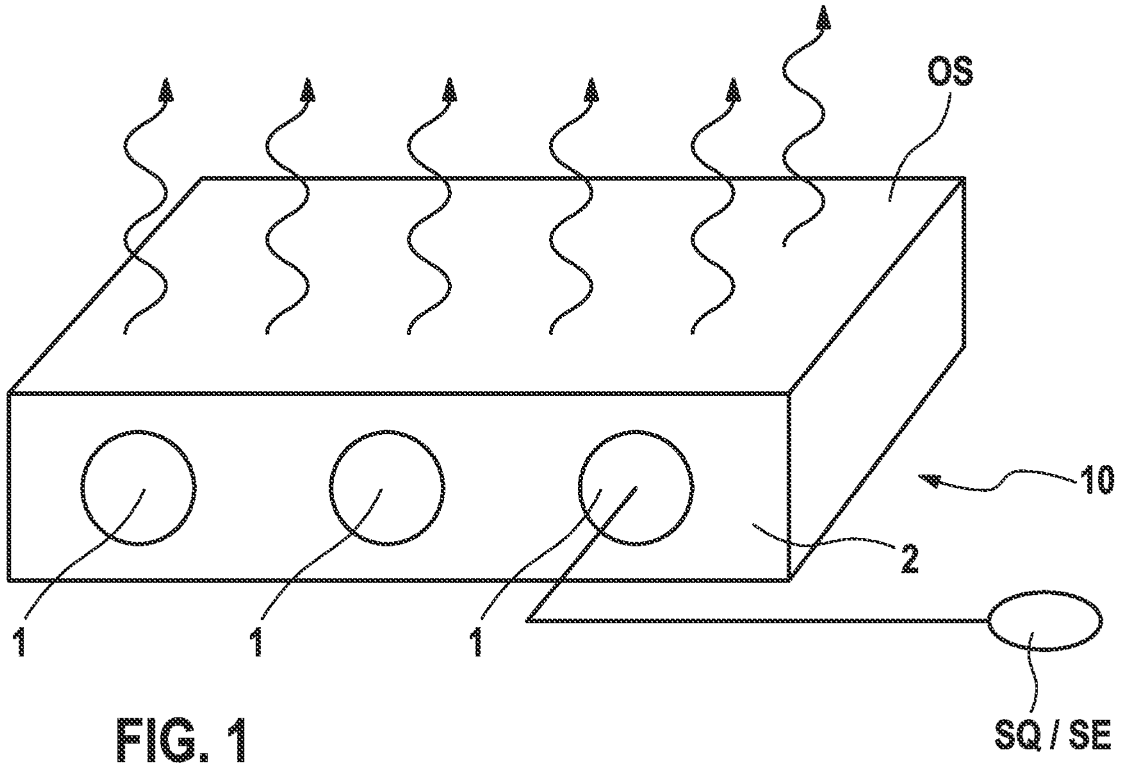
FIG. 1 is a schematic view of a heating-wire device according to an exemplary embodiment of the present invention.

FIG. 1 is a schematic view of a heating-wire device according to an exemplary embodiment of the present invention.

The heating-wire device 10 comprises at least one heating wire 1, in particular, according to FIG. 1, three heating wires extending in parallel, a heating region 2, which comprises the heating wires 1 embedded therein and can be heated by the heating wires 1; a current source SQ, which is connected to the heating wires 1 and is configured to apply a current to the heating wires 1 and heat them; a controller SE, using which the current source SQ can be controlled; a first adhesion-promoting layer (not shown), which is arranged on a surface of the relevant heating wire 1 and surrounds the surface thereof, wherein the heating region 2 surrounds the first adhesion-promoting layer. In this case, the heating region 2 can comprise a surface OS which can be heated.

The adhesion-promoting layer can also be formed as a stress equalization layer and a corresponding coating. The heating wire 1 can comprise a metal material, for example, steel, steel alloys, copper, or other materials, and can therefore cover many areas of application, depending on the requirements.

The heating region 2 can, for example, comprise an enameled coating or a polymer, which can have sufficient ductility to ensure or approximate a temperature equalization.

Furthermore, the material can be tailored to the adhesion promoter (the probability of the adhesion promoter being removed by the coating, for example the sheath or the outer region, can then be reduced). The coating thickness can be determined on the basis of the heat conduction and can be synchronized with the material using which encapsulation can then be carried out. The aim is to easily melt the adhesion promoter in order to ensure a good connection.

The coated heating wire (which is coated with the adhesion promoter) can be used in a heated cover or radome for radar sensors. These may be radomes with an open installation as well as heatable design panels. Wires of this kind can then likewise be used in any sensors or actuators in which heating wires are embedded in plastics material. These benefits can be utilized when laying the wire.

A winding carrier (plastics carrier having a wire wound thereon) can be encapsulated in a further injection-molding process. The injection-molding compound then sheathes everything. An alternative method would be hot stamping, in which a heated wire is sealed into plastics material. The coating thickness can be a design parameter for controlling ductility or for increasing the surface area (a greater diameter of the wire and sheath reduces the energy density at the transition from the wire to the plastics matrix).

Figure 2:
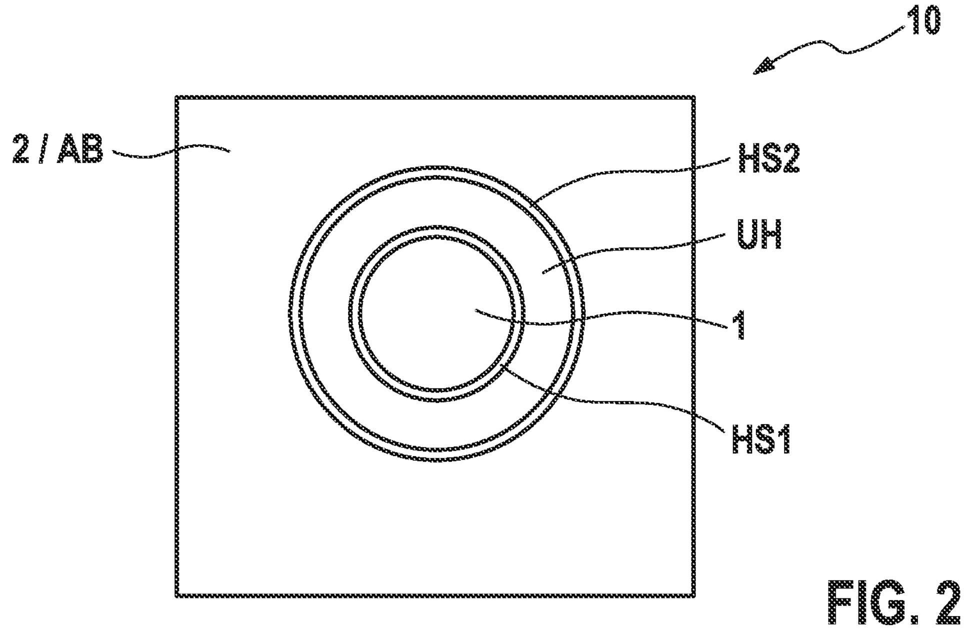
FIG. 2 is a schematic view of a heating-wire device according to a further exemplary embodiment of the present invention.

FIG. 2 is a schematic view of a heating-wire device according to a further exemplary embodiment of the present invention.

The heating-wire device 10 in FIG. 2 can be similar to that in FIG. 1, although, in addition to embedding the heating wire through the heating region, a sheath UH can be provided between a first adhesion-promoting layer HS1 and a second adhesion-promoting layer HS2. The heating-wire device 10 can thus comprise a sheath UH and a second adhesion-promoting layer HS2, wherein the sheath UH surrounds the first adhesion-promoting layer HS1 and the second adhesion-promoting layer HS2 surrounds the sheath, wherein an outer region of the heating region 2 can be applied to the sheath UH so as to embed it therein. The two adhesion-promoting layers, the sheath, and the outer region can constitute the heating region together or in part.

By way of the first and/or the second adhesion-promoting layer, the requirements for promoting adhesion and decreasing stresses can be met in combination by one material.

The adhesion-promoting layers can counteract delamination and can provide a good and similar flow of heat in the heating wire, adhesion-promoting layer, and sheath(s). A first coefficient of thermal expansion (of the first adhesion-promoting layer) and a second coefficient of thermal expansion (of the sheath) can differ from one another by less than a predetermined first variation value. The second coefficient of thermal expansion of the sheath UH can be adjusted to a third coefficient of thermal expansion of the second adhesion-promoting layer HS2, wherein the second coefficient of thermal expansion and the third coefficient of thermal expansion can differ from one another by less than a predetermined second variation value.

Figure 3:
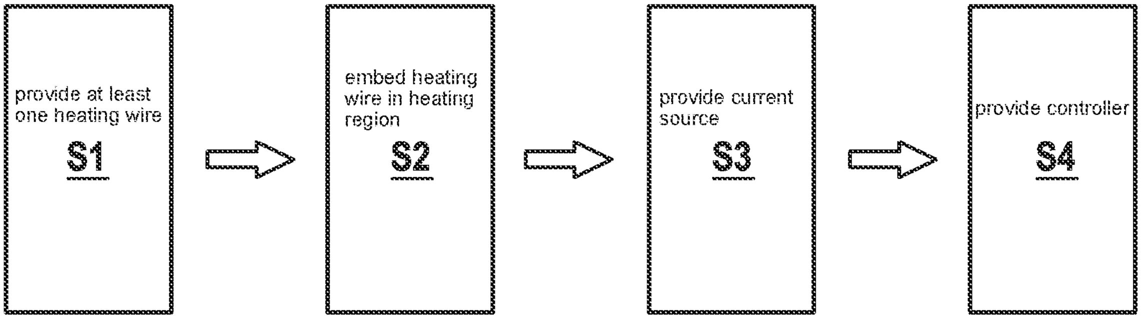
FIG. 3 is a block diagram of method steps of the method for producing a heating-wire device according to an exemplary embodiment of the present invention.

FIG. 3 is a block diagram of method steps of the method for producing a heating-wire device according to an exemplary embodiment of the present invention.

In the method, at least one heating wire is provided S1, the heating wire is embedded S2 in the heating region, wherein a first adhesion-promoting layer is arranged on a surface of the heating wire and surrounds the surface thereof, wherein the heating region surrounds the first adhesion-promoting layer; a current source is provided S3, which is connected to the heating wire and is configured to apply a current to the heating wire and heat it; and a controller is provided S4, using which the current source can be controlled.

Although the present invention has been described in full above on the basis of the preferred exemplary embodiment, it is not limited thereto, but instead can be modified in various ways.

What is claimed is:

1. A heating-wire device, comprising:

at least one heating wire;

a heating region which includes the at least one heating wire embedded therein, the heating region being heatable by the heating wire;

a current source, which is connected to the heating wire and is configured to apply a current to the heating wire and heat it;

a controller configured to control the current source;

a first adhesion-promoting layer arranged on a surface of the heating wire and surrounding the surface of the heating wire, wherein the heating region surrounds the first adhesion-promoting layer; and a sheath and a second adhesion-promoting layer, wherein the sheath surrounds the first adhesion-promoting layer and the second adhesion-promoting layer surrounds the sheath, wherein an outer region of the heating region is applied to the sheath so as to embed it therein.

2. The heating-wire device as recited in claim 1, wherein the first adhesion-promoting layer and/or the second adhesion-promoting layer includes silane.

3. The heating-wire device as recited in claim 1, wherein the sheath includes an enameled coating or a polymer.

4. The heating-wire device as recited in claim 1, wherein a first coefficient of thermal expansion of the first adhesion-promoting layer is adjusted to a second coefficient of thermal expansion of the sheath, wherein the first coefficient of thermal expansion and the second coefficient of thermal expansion differ from one another by less than a predetermined first variation value.

5. The heating-wire device as recited in claim 1, wherein a second coefficient of thermal expansion of the sheath is adjusted to a third coefficient of thermal expansion of the second adhesion-promoting layer, wherein the second coefficient of thermal expansion and the third coefficient of thermal expansion differ from one another by less than a predetermined second variation value.

6. A method for producing a heating-wire device, comprising the following steps:

providing at least one heating wire;

embedding the heating wire in a heating region, wherein a first adhesion-promoting layer is arranged on a surface of the heating wire and surrounds the surface of the heating wire, wherein the heating region surrounds the first adhesion-promoting layer;

providing a current source, which is connected to the heating wire and is configured to apply a current to the heating wire and heat it; and providing a controller configured to control the current source, wherein a sheath is sprayed onto the first adhesion-promoting layer and a second adhesion-promoting layer is applied to the sheath, wherein the second adhesion-promoting layer is melted at least in some regions when it is arranged on the sheath and wherein an outer region of the heating region is applied to the second adhesion-promoting layer so as to embed it therein.

7. The method as recited in claim 6, wherein the first adhesion-promoting layer is melted at least in some regions when it is arranged on the surface of the heating wire.

* * * * *